(12) United States Patent  (10) Patent No.: US 6,709,005 B2
Amamori                    (45) Date of Patent:     Mar. 23, 2004

(54) AIRBAG RETAINER

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 203 days.

(21) Appl. No.: 09/983,739

(22) Filed: Oct. 25, 2001

(65) Prior Publication Data

US 2002/0050701 A1 May 2, 2002

(30) Foreign Application Priority Data

Nov. 1, 2000 (JP) .......................................... 2000-334394
Sep. 11, 2001 (JP) .......................................... 2001-275410

(51) Int. Cl.$^7$ ................................................. B60R 21/20
(52) U.S. Cl. ................................. 280/728.2; 280/732
(58) Field of Search ............................. 280/728.2, 732, 280/731, 728.1, 728.3

(56) References Cited

U.S. PATENT DOCUMENTS

| 5,630,612 A | * | 5/1997 | Yamamoto et al. | 280/728.2 |
| 5,678,850 A | * | 10/1997 | Ricks et al. | 280/728.2 |
| 5,851,023 A | * | 12/1998 | Nagata et al. | 280/728.3 |
| 6,250,669 B1 | * | 6/2001 | Ohmiya | 280/732 |
| 6,394,485 B1 | * | 5/2002 | Amamori | 280/728.2 |
| 6,406,056 B2 | * | 6/2002 | Yokota | 280/728.2 |

* cited by examiner

Primary Examiner—David R. Dunn
(74) Attorney, Agent, or Firm—Kanesaka & Takeuchi

(57) ABSTRACT

An airbag retainer houses and holds an airbag and an inflator for supplying gas for inflating the airbag. The retainer is formed of an upper retainer as a bag-housing member made of a resin having a plurality of flange-shaped fastening portions, and a lower retainer as an inflator-holding member attached to the bag-housing member to have surface-to-surface contact and having a fastening portion. At least one fastening portion of the upper retainer among the plurality of fastening portions underlies the corresponding fastening portion of the lower retainer.

10 Claims, 12 Drawing Sheets

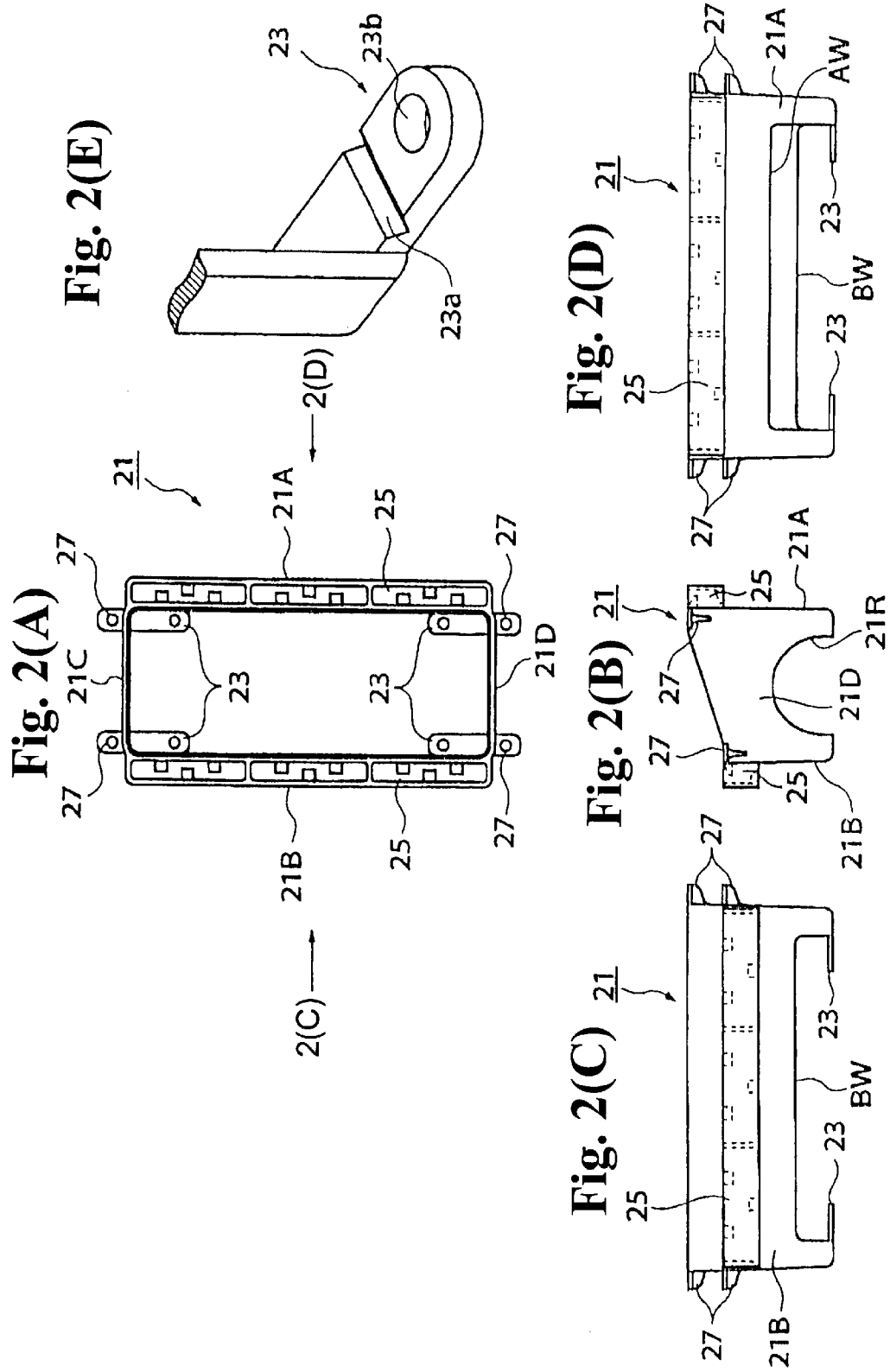

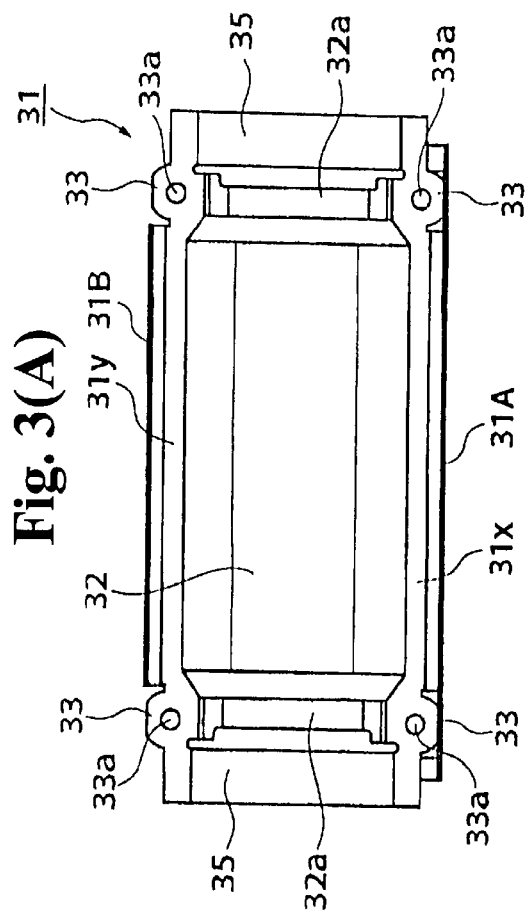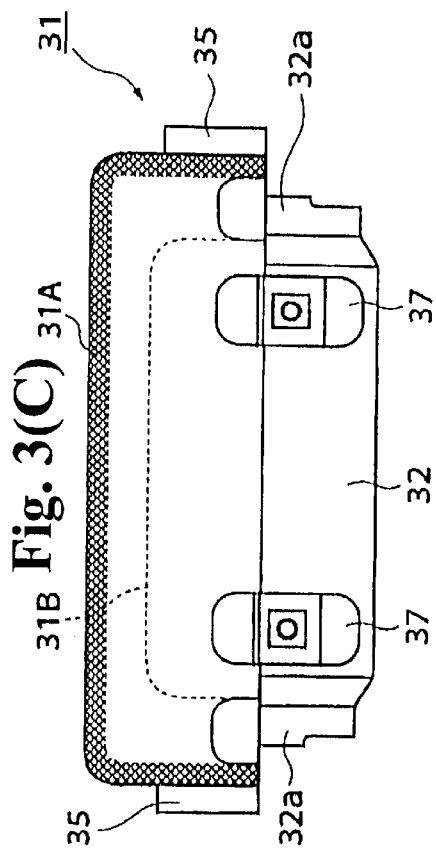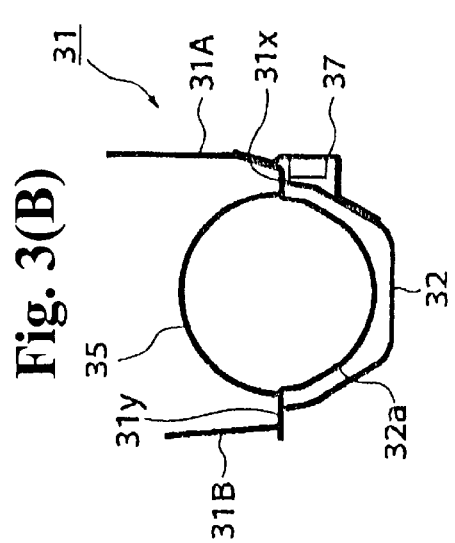

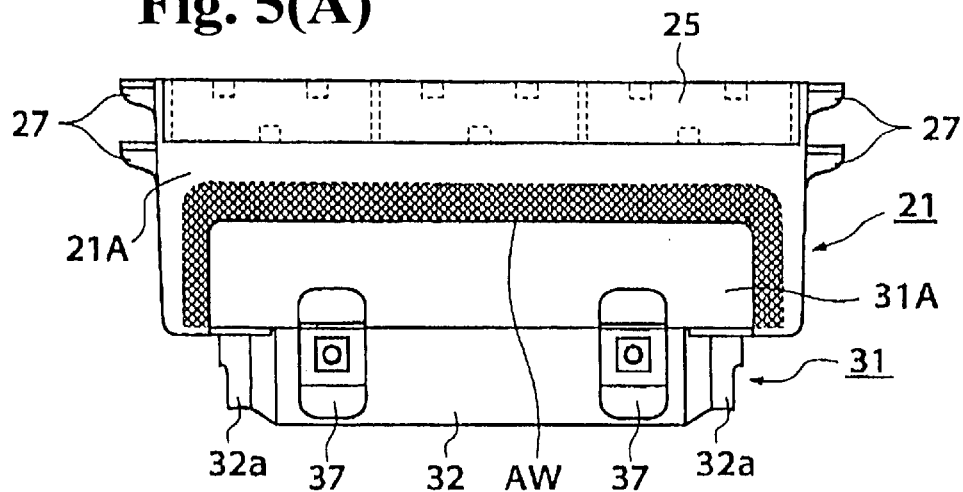
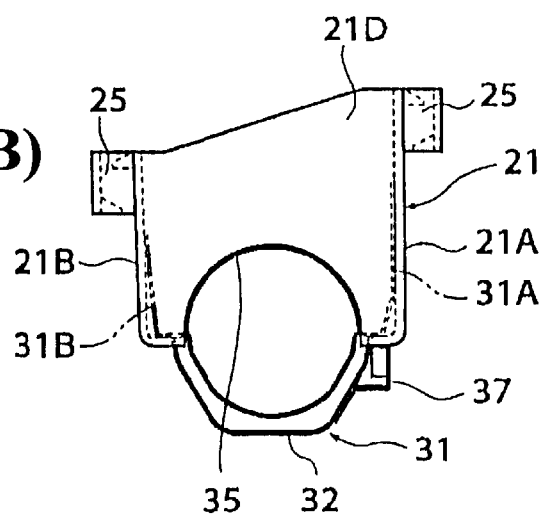
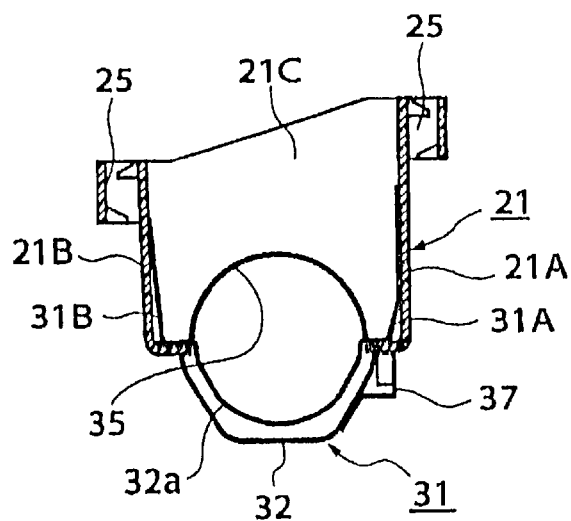

AIRBAG RETAINER

BACKGROUND OF THE INVENTION AND RELATED ART STATEMENT

The present invention relates to an airbag retainer for housing an airbag for protecting a vehicle occupant and the like, and more specifically, it relates to an airbag retainer having advantages of reduced cost and weight, and so on.

Most of conventional passenger vehicles are equipped with at least one airbag assembly, such as a driver airbag, a passenger airbag and a rear-seat airbag, as well as a side airbag in order to protect passengers in the event of a vehicle collision. A typical airbag assembly is mounted in a vehicle as a module incorporating a bag, a retainer, an inflator, a cover and so on.

Regarding a passenger airbag assembly as an example, a known art of the airbag assembly will be described. FIG. 10(A) is a side sectional view illustrating an example of a known passenger airbag assembly which is mounted on a board. FIG. 10(B) is a plan view illustrating the interior of a retainer of the airbag assembly in FIG. 10(A). FIG. 10(C) is a side sectional view illustrating in further detail another known passenger airbag assembly.

An airbag assembly 100 is placed in a position so as to face a windshield F mounted above an instrument panel P of a vehicle as shown in FIG. 10(A). The airbag assembly 100 has a retainer 110, wherein a cover 120, which is brought into alignment with the instrument panel P, is fixed by using cover-fixing portions 121. With this arrangement, the retainer 110 is welded at the bottom thereof to a bracket 114. A bag 103 and an inflator 105 for feeding gas into the bag 103 are arranged in the retainer 110. The bag 103 is folded and housed in the retainer 110 under normal conditions.

The retainer 110 includes a box-shaped main unit ill with a bottom and flange surfaces as shown in FIGS. 10(B) and 10(C) for better understanding. The main unit 111 has a solid structure made of metal or resin and a plurality of fixing plates 113, which engages the cover-fixing portions 121, at the mouth edge of the main unit 111. An engagement opening 110a for the inflator 105 is provided to open at the bottom of the main unit 111. A bag plate 115 integrally formed of a semicircular portion 115a and a plurality of flange portions 115b is arranged in the main unit 111. The semicircular portion 115a of the bag plate 115 holds the inflator 105. Bolts 119 fix the flange portions 115b of the bag plate 115 to a flange surface of the retainer 110. The end of an opening of the bag 103 is put between the flange portion 115b and the flange surface of the retainer 110 in a state such that the bag plate 115 is fixed to the retainer 110.

With this airbag assembly 100, the gas in the inflator 105 is introduced into the bag 103 in the event of a vehicle collision. Subsequently, the bag 103 breaks the cover 120 by tearing a tear line 122 thereof, and inflates in front of a passenger.

The retainer 110 of the above-described known airbag assembly 100 has the following problems because of its solid structure made of a metal or resin.

(I) Retainer Made of Metal (1) A metal retainer is formed by deep drawing or sheet metal welding. Because of its poor formability as compared to sheet metal welding, deep drawing is unsuitable for forming a metal sheet into a complicated shape. Sheet metal welding, on the other hand, requires an increased number of manufacturing processes for welding, resulting in increased cost.

(2) Metal retainers are heavier than resin retainers.

(II) Retainer Made of Resin (3) Attaching a fixing bracket made of metal to a main unit of a resin retainer after the main unit has been molded requires an increased cost. The main unit and the fixing bracket therefore are often formed in a single-piece manner. This single-piece structure, however, does not allow only one type of a retainer to be used for plural types of vehicles, each having a different bracket (see the bracket 114 in FIG. 10(A) as an example). Therefore, the resin retainer requires a new metal mould for producing a whole retainer, even though the only difference between them resides in the shapes of the fixing brackets. This limits the range of usage of the resin retainer.

(4) only compressed-gas type inflators are appropriate for the resin retainers, because the portions of the retainers coming into contact with inflators may melt due to heat generated when the inflators are ignited.

(5) Two types of inflators are available, i.e. a compressed gas type and a combustion gas type, and an appropriate one is chosen. In the meantime, as to the inflator of the compressed gas type, little change in temperature occurs in the inflator body upon activation, as compared to that of the combustion type. Because of the reason as mentioned in (4), an inflator of the compressed gas type is usually an only choice.

(6) A resin retainer requires a thicker plate than a metal retainer does in order to obtain the same strength. Specifically, the thickness of a resin plate must be three times or more greater than that of a metal plate while the thickness of about 1 mm is sufficient for the metal plate, thereby rendering it difficult to downsize the resin retainer.

In view of the above-described problems, the object of the present invention is to provide an airbag retainer having advantages of reduced cost, weight, and size.

Further objects and advantages of the invention will be apparent from the following description of the invention

SUMMARY OF THE INVENTION

To solve the above-described problems, an airbag retainer of the present invention, for housing and holding an airbag which inflates in an emergency and an inflator which supplies gas for inflating the airbag, comprises a bag-housing member (an upper portion: an upper retainer) made of a resin, and an inflator-holding member (a lower portion: a lower retainer) made of metal.

The airbag retainer according to the present invention has an improved formability, and can achieve the reduced production cost and weight, as compared to a solid metal retainer. When comparing with a solid resin retainer, because of the increased heat endurance strength of the inflator-holding member, an inflator in a wider range of types is available for the airbag retainer. In addition, the above increased strength permits the inflator-holding member to reduce its thickness, accordingly allowing the retainer to reduce its height.

When the airbag retainer of the present invention is applied to a plurality of different types of vehicles, the only thing to do is to choose a usable bracket, which is to be spot-welded to the lower retainer, according to a vehicle type. This renders the airbag retainer suitable for a wider range of uses. Welding the bracket to the lower retainer is a known fixing art as has been used for conventional retainers.

According to the airbag retainer of the present invention, the upper retainer may have a frame-shaped structure provided with sidewalls on the four sides thereof, and the lower retainer may have sidewalls on a pair of opposing sides among its four sides, such that the sidewalls of the lower retainer partly overlap the corresponding sidewalls of the upper retainer.

This structure serves to enhance the strength against an expansive force of the inflating bag, thereby to prevent a fish-mouth deformation of the retainer. The fish-mouth deformation means a state in which the central portions of the sidewalls of the lower retainer are deformed outward upon receiving the expansive force of the inflating bag.

Also, according to the airbag retainer of the present invention, the upper retainer and the lower retainer may have a plurality of fastening portions. At least one of the plurality of fastening portions is preferably broken or stretched when a load is applied to an instrument panel of an automobile.

Further, according to the airbag retainer of the present invention, a plurality of flange-shaped fastening portions of each of the upper retainer and the lower retainer is preferable arranged to have surface-to-surface contact with each other. At least one fastening portion of the upper retainer among the plurality of fastening portions is preferably arranged to underlie the corresponding fastening portion of the lower retainer.

The metal lower retainer bears a tension of the inflating bag on its flange surfaces, thereby serving to provide enough strength of the airbag retainer. When a passenger hits his head against an instrument panel, on the other hand, the resin upper retainer is easily deformed because of less constraint in the downward direction. With this arrangement, the lower retainer can be built to the upper retainer from either above or below.

Still further, according to the airbag retainer of the present invention, each of the plurality of fastening portions of the upper retainer may have a notch or depression formed thereon. The depressed portion is thinner than other portions of the same fastening portion. When a passenger hits his head against an instrument panel P, accordingly, the fastening portion is likely to be sheared or deformed at the depression.

Yet further, according to the airbag retainer of the present invention, a protrusion is preferably formed on a sidewall of the lower retainer. When a passenger hits his head against the instrument panel, the upper retainer is pushed from the upper mouth thereof. With this pushing force, the upper retainer is deformed from its top, and moved downward to hit the protrusion of the lower retainer. That is, the sidewall of the upper retainer pushes down the sidewall of the lower retainer from above.

According to the airbag retainer of the present invention, the sidewall of the upper retainer, which overlaps the corresponding sidewall of the lower retainer, may have a window formed by cutting away the lower part of the sidewall. Also, an outer surface of the sidewall of the lower retainer is preferably exposed outward at the window.

For attaching a vehicle-mounting bracket (bracket for mounting an airbag module on an internal frame of a vehicle body) to the side wall of the lower retainer, the window of the sidewall of the upper retainer serves to provide a wide area where the side wall of the lower retainer is exposed outward, thereby rendering a variety of vehicle-mounting brackets available.

When the material costs of resin and metal for the same area are compared, the resin costs about three times of metal. According to this embodiment of the present invention, the window formed in the sidewall serves to reduce the quantity of resin used, leading to achieve the reduced cost.

Still yet further, according to the airbag retainer of the present invention, a plurality of reinforcement portions is preferably provided along the edges of an upper mouth of the upper retainer. With this construction, the plurality of reinforcement portions serves to suppress the deformation of the upper retainer caused by a load of the inflating bag.

Furthermore, according to the airbag retainer of the present invention, the upper retainer may have the upper mouth wider than the lower mouth. With this configuration, a plurality of retainers can be stacked, thereby requiring less space for transportation or inventory.

Still furthermore, an airbag retainer of the present invention is used for housing and holding an airbag that inflates in an emergency, and an inflator that supplies gas for inflating the airbag. The airbag retainer comprises a bag-housing member (upper retainer) which is made of steel or light metal containing at least one of magnesium and aluminum, and an inflator-holding member (lower retainer) which is made of metal. A plurality of flange-shaped fastening portions of the upper retainer and the lower retainer is arranged to have surface-to-surface contact with each other. At least one fastening portion of the upper retainer among the plurality of fastening portions is arranged to underlie the corresponding fastening portion of the lower retainer.

BRIEF DESCRIPTION OF THE DRAWINGS

FIGS. 2(A) and 2(B) are a plan view and a side view of a bag-housing member (upper retainer) as an upper part of a retainer of the airbag assembly, respectively, according to the embodiment of the present invention; FIGS. 2(C) and 2(D) are a front view and a rear view of the bag-housing member viewed from the directions of 2(C) and 2(D) of FIG. 2(A), respectively; and FIG. 2(E) is an enlarged schematic view of a fastening portion of the upper retainer;

FIGS. 3(A), 3(B) and 3(C) are a plan view, a side view, and a front view of an inflator-holding member (lower retainer) as a lower part of the retainer of the airbag assembly, respectively, according to the embodiment of the invention;

FIGS. 5(A) to 5(C) are, respectively, an elevation view, a side view and a side sectional view of the upper retainer shown in FIGS. 2(A) to 2(D) and lower retainer shown in FIGS. 3(A) to 3(C) in a state that the upper and lower retainers are assembled together;

DETAILED DESCRIPTION OF PREFERRED EMBODIMENTS

Figure 1:
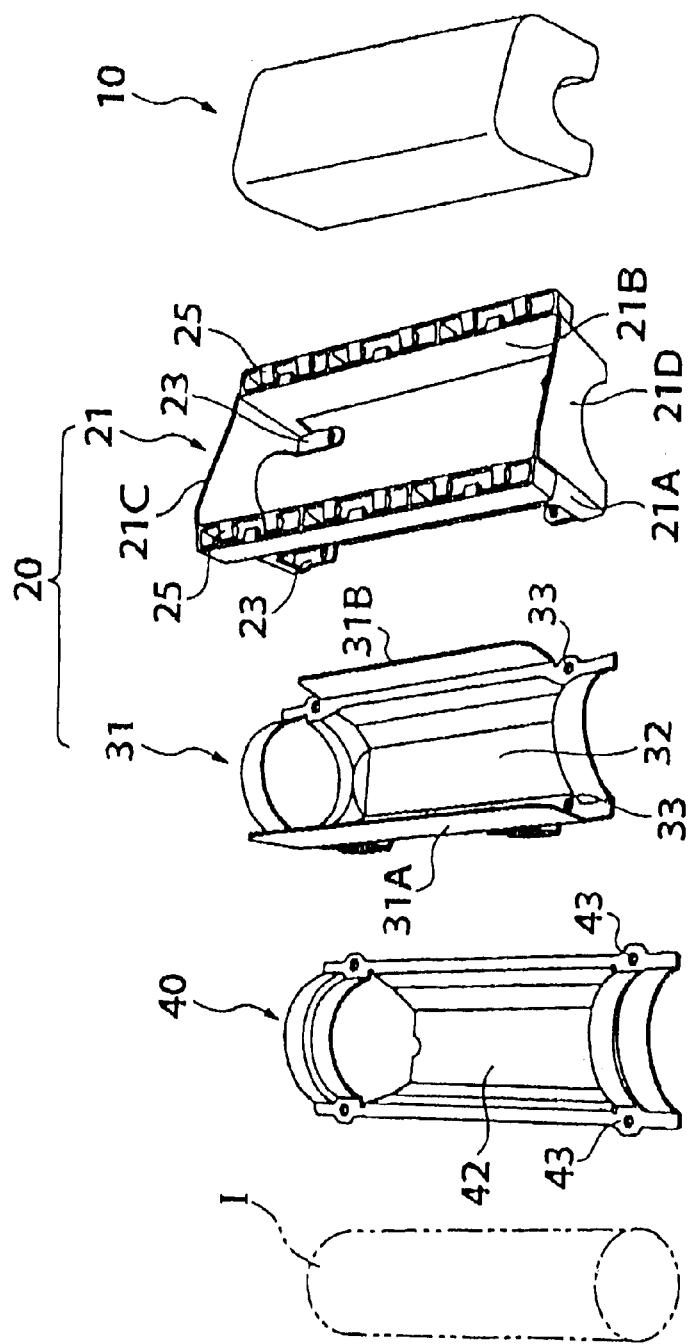
FIG. 1 is an exploded schematic view of an airbag assembly according to an embodiment of the present invention.

Referring to the attached drawings, embodiments of the present invention will be described. FIG. 1 is an exploded schematic view of an airbag assembly according to an embodiment of the present invention. FIGS. 2(A) and 2(B) are, respectively, a plan view and a side view of a bag-housing member (upper retainer) as an upper part of a retainer of the airbag assembly according to the embodiment of the present invention. FIGS. 2(c) and 2(D) are, respectively, an elevation view and a rear view of the bag-housing member viewed from the directions of 2(C) and 2(D) indicated in FIG. 2(A). FIG. 2(E) is an enlarged schematic view of a fastening portion of the upper retainer. FIGS. 3(A), 3(B) and 3(C) are, respectively, a plan view, a side view, and a front view of an inflator-holding member (lower retainer) as a lower part of the retainer of the airbag assembly according to the embodiment of the invention.

Figure 4A:
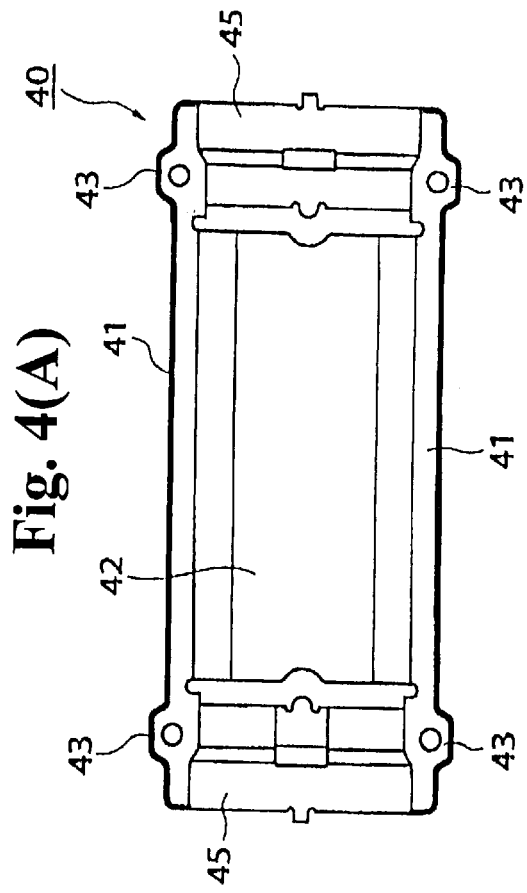
FIGS. 4(A), 4(B) and 4(C) are a plan view, a side view and a front view of a bag plate of the airbag assembly, respectively, according to the embodiment of the invention.
Figure 4C:
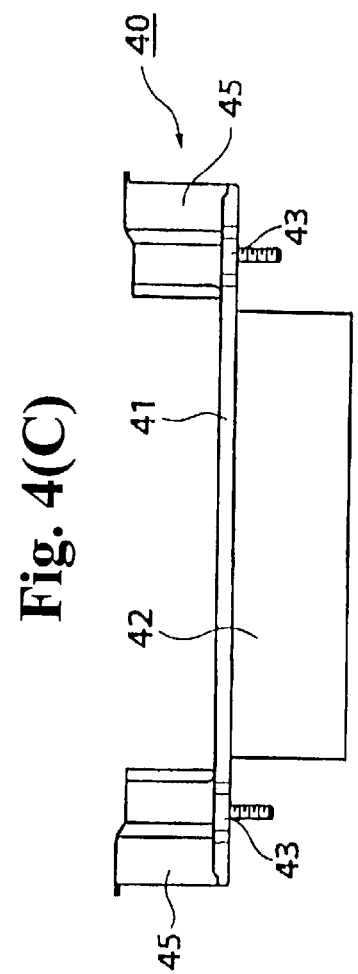
Figure 4B:
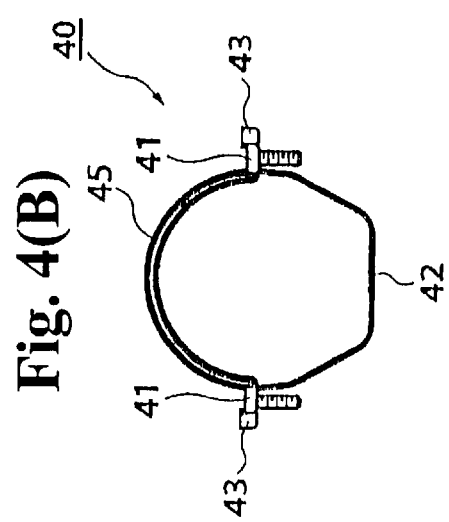
Figure 6:
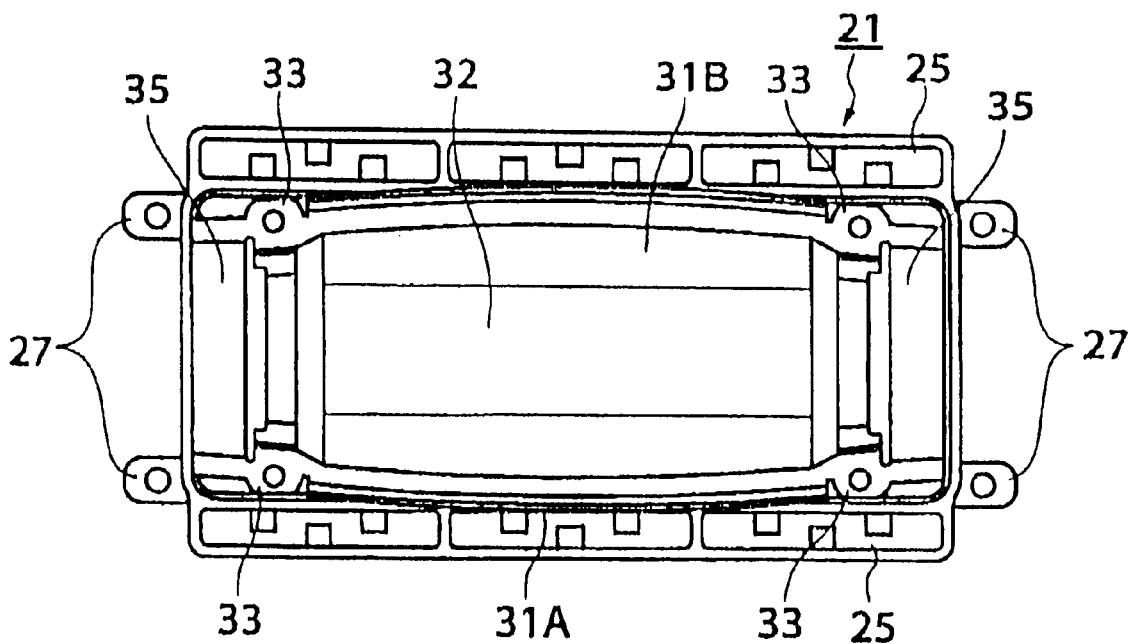
FIG. 6 is a plan view of an example of the retainer, according to the embodiment of the present invention, in a state that the retainer is deformed due to an expansive force of an inflating bag.

FIGS. 4(A), 4(B) and 4(C) are a plan view, a side view and a front view of a bag plate of the airbag assembly, respectively, according to the embodiment of the invention. FIGS. 5(A), 5(B) and 5(C) are, respectively, a front view, a side view, and a side sectional view of the upper retainer shown in FIGS. 2(A) to 2(D) and the lower retainer shown in FIGS. 3(A) to 3(C) in a state that the upper and lower retainers are assembled together. FIG. 6 is a plan view of an example of the retainer, according to the embodiment of the present invention, in a state that the retainer is deformed due to an expansive force of an inflating bag.

The airbag assembly of the embodiment generally comprises the following members as shown in FIG. 1:

(1) An airbag 10 which inflates in an emergency (FIG. 1 shows the airbag in an folded state.);

(2) An inflator I which supplies gas for inflating the airbag;

(3) A retainer 20 for housing and holding the airbag 10 and inflator I;

(4) A bag plate 40 for fixing the airbag 10 and inflator I to the retainer 20;

(5) An acceleration sensor and an electrical circuit for activating the inflator I in an emergency, and a cover, though not shown in the figure.

The present invention has a feature in which the retainer 20 has an upper retainer 21 for housing the airbag 10 and a lower retainer 31 for holding the inflator I, wherein the upper retainer 21 is made of a resin, such as nylon and polypropylene, and the lower retainer 31 is made of metal, such as a cold rolled steel sheet. Now the structure of the retainer 20 will be described.

Referring mainly to FIGS. 2(A) to 2(E), the upper retainer 21 of the retainer 20 will be described. The upper retainer 21 has a rectangular frame-like structure having side walls 21A to 21D on the four sides thereof as shown in FIGS. 2(A) to 2(D). As for the side walls 21A and 21B, among the side walls 21A to 21D, extending along the longitudinal direction of the upper retainer 21, the side wall 21A extends upward more than the side wall 21B. Windows AW and BW are formed at the lower parts of the side walls 21A and 21B, respectively. Side walls of the lower retainer 31 are partly exposed outward at the windows AW and BW in a state such that the upper retainer 21 and the lower retainer 31 are assembled (see FIGS. 5(A) to 5(C)). The windows AW and BW serve to reduce the quantity of resin material used, to thereby reduce the cost of the material. In addition, a plurality of ribs 25 is provided on the upper edges of the side walls 21A and 21B along the longitudinal direction of the upper retainer 21. The ribs 25 function as reinforcement against a load from an inflating bag.

Each of the side walls 21C and 21D, which are orthogonal to the side walls 21A and 21B of the upper retainer 21, has a semicircular recess 21R formed by cutting the lower part thereof as shown in FIG. 2(B). The ends of the inflator I (see FIG. 1) are both fit into these recesses 21R.

The upper retainer 21 has four flange-shaped fastening portions 23 at the bottom corners thereof, which extrude inwardly. As shown in FIG. 2(E) for easy understanding, each fastening portion 23 has a bolt-hole 23b and a notch 23a formed at the free end and the fixed end thereof, respectively. This notch 23a is formed to facilitate the fastening portion 23 to be deformed when a passenger hits the head against an instrument panel. These fastening portions 23 are bolted, in a surface-to-surface contact state, with the corresponding fastening portions 33 (which will be described referring to FIGS. 3(A) to 3(C) and 5(A) to 5(C)) of the lower retainer 31.

Referring mainly to FIGS. 3(A) to 3(C), the lower retainer 31 of the retainer 20 will be described. The lower retainer 31 has a bottom portion 32 for accommodating the inflator I (see FIG. 1) as shown in FIGS. 3(A) to 3(C). The bottom portion 32 is formed to have a half-hexagonal cross-section at the central part thereof and semicircular cross-sections at both ends thereof (right and left ends of FIGS. 3(A) and 3(C)). Semi-annular arch portions 35 are provided on the right and left ends of the bottom portion 32. The arch portions 35 are fitted inside arch portions 45 of the bag plate 40.

Side walls 31A and 31B stand up on upper edges 31x and 31y of the bottom portion 32 extending along the longitudinal direction of the bottom portion 32, respectively. The side wall 31A extends upward higher and laterally wider than the side wall 31B. The side walls 31A and 31B are located inside the side walls 21A and 21B, respectively, in a state such that the upper retainer 21 and the lower retainer 31 are assembled (see FIGS. 5(A) to 5(C)). In this state, the side walls 31A and 31B of the lower retainer 31 partly overlap the side walls 21A and 21B of the upper retainer 21, respectively (see the half-tone dot meshing part indicated in FIG. 3(C)). The overlapped part has about 10 to 20 mm in width. The inside parts of the walls 31A and 31B surrounded by the overlapped portions are exposed outward at the windows AW and BW of the side walls 21A and 21B, respectively.

The bottom portion 32 has four flange-shaped fastening portions 33, each being formed around the corner of the upper edge. The portions 33 correspond to the fastening portions 23 of the upper retainer 21, each having a bolt-hole 33a formed therein. At least one vehicle-mounting bracket 37 is attached to each side surface of the bottom portion 32 and the side wall 31A. The vehicle-mounting bracket 37 is intended to attach the retainer 20 to an interior frame of a vehicle. The side wall 31A exposed partly outward at the window AW of the side wall 21A serves to provide a wide area for attaching a bracket thereon, thereby rendering a variety of shapes and sizes of vehicle-mounting brackets available.

Referring now mainly to FIGS. 4(A) to 4(C), the bag plate 40 will be described. The bag plate 40 is intended to clamp the airbag 10 and the inflator I (see FIG. 1) inside the retainer 20. The bag plate 40 has two flanges 41 extending parallel to the longitudinal direction. Between these flanges 41 of the bag plate 40, the bottom portion 42 with a half-hexagonal cross section is provided at the lower part of the central portion of the bag plate 40 extending along the longitudinal direction. The bottom portion 42 is arranged along the inner surface of the bottom portion 32 of the lower retainer 31. Between these flanges 41, semicircular arch portions 45 are provided on both longitudinal ends of the bag plate 40. The arch portions 45 are arranged along the arch portions 35 of the lower retainer 31. Corresponding to the fastening portions 23 of the upper retainer 21 and the fastening portions 33 of the lower retainer 31, the flanges 41 have four fastening portions 43, each being formed around the upper edge corner of the bag plate 40. The inflator I is of a cylindrical shape as shown in FIG. 1, and inserted between the bottom portion 42 and the arch portion 45.

The retainer 20 with the above-described arrangement will be described in an assembled state. The retainer 20 has the lower retainer 31 arranged under the upper retainer 21 as shown in FIGS. 5(A) to 5(C). In the case shown in FIGS. 5(A) to 5(C), the lower retainer 31 is assembled in the upper retainer 21 from the upper side of retainer 20. With this arrangement, the side walls 31A and 31B of the lower retainer 31 are located inside the side walls 21A and 21B of the upper retainer 21, respectively. In addition, the fastening portions 33 of the lower retainer 31 lie on the corresponding fastening portions 23 of the upper retainer 21 in a closely contacting manner. Further, the inflator I (see FIG. 1) is inserted in a state such that the retainer 20, the airbag 10 (see FIG. 1), and the bag plate 40 are assembled. Then, a bolt is inserted into each of the portions 23, 33 and 43 arranged at each corner so as to integrally fasten the mouth edges of the upper retainer 21, the lower retainer 31, the bag plate 40, and the airbag 10.

The retainer 20 is fixedly mounted in a vehicle body by fixing brackets 27 and the vehicle-mounting brackets 37. In the case of a passenger airbag assembly, for example, the retainer 20 is fixedly mounted in an instrument panel P of a vehicle as shown in FIG. 10(A).

The retainer 20 is deformed in a manner such that the central portions of the side walls 31A and 31B of the lower retainer 31 are deformed outward upon receiving an expansive force of an inflating bag as shown in FIG. 6. This is called a fish-mouth deformation. Reinforcement of these side walls 31A and 31B at the overlapped portions by the side walls 21A and 21B of the upper retainer 21 serves to prevent the fish-mouth deformation of the retainer 20.

In addition, fixing the side walls 21A and 31A of the upper retainer 21 and the lower retainer 31, as well as the side walls 21B and 31B of the upper retainer 21 and the lower retainer 31 by using, e.g., rivets, can be eliminated by providing sufficient strength at the overlapped portions.

Figure 10A:
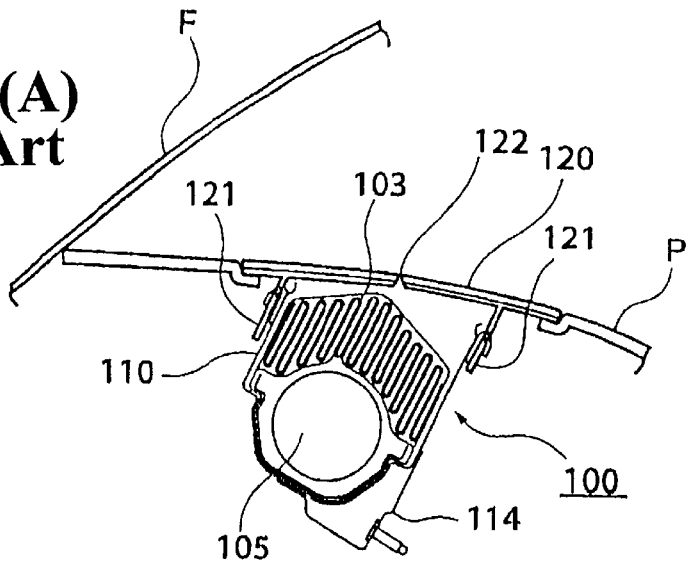
FIG. 10(A) is a side sectional view illustrating an example of a known passenger airbag assembly mounted on a board.
Figure 10B:
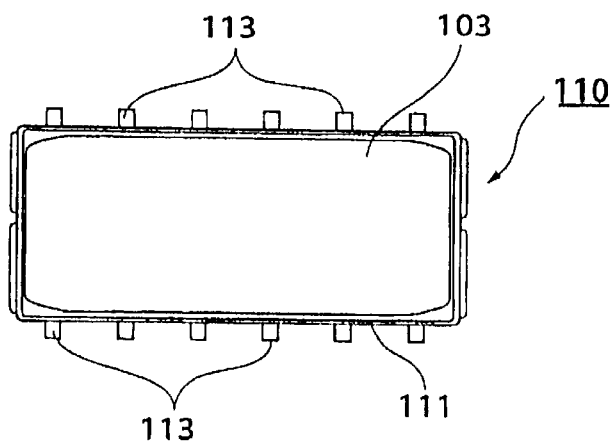
FIG. 10(B) is a plan view illustrating the interior of a retainer of the airbag assembly in FIG. 10(A)
Figure 10C:
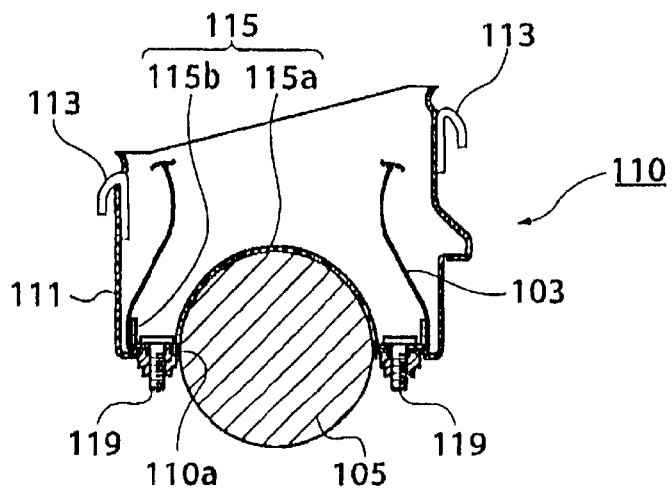
FIG. 10(C) is a side sectional view illustrating in further detail another known passenger airbag assembly.

When a passenger hits the head against an instrument panel P (see FIGS. 10(A) to 10(C)), the upper retainer 21 is cracked or broken at the notch 23a of the fastening portion 23 as shown in FIG. 2(E), serving to absorb a load from the passenger.

Figure 12A:
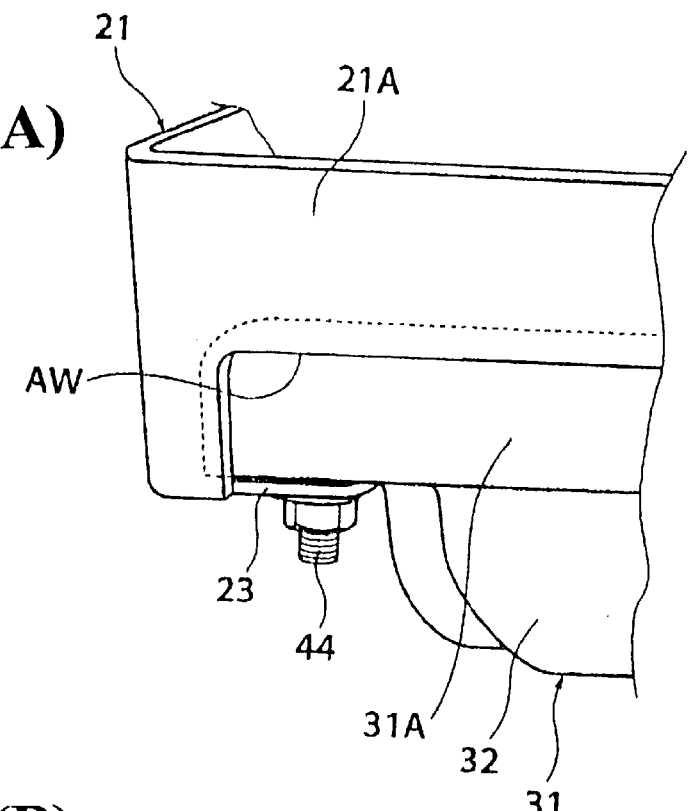
FIGS. 12(A) and 12(B) are enlarged schematic views of the vicinity of the fastening portion of the retainer, respectively, in a normal state and a deformed state caused by an applied force.
Figure 12B:
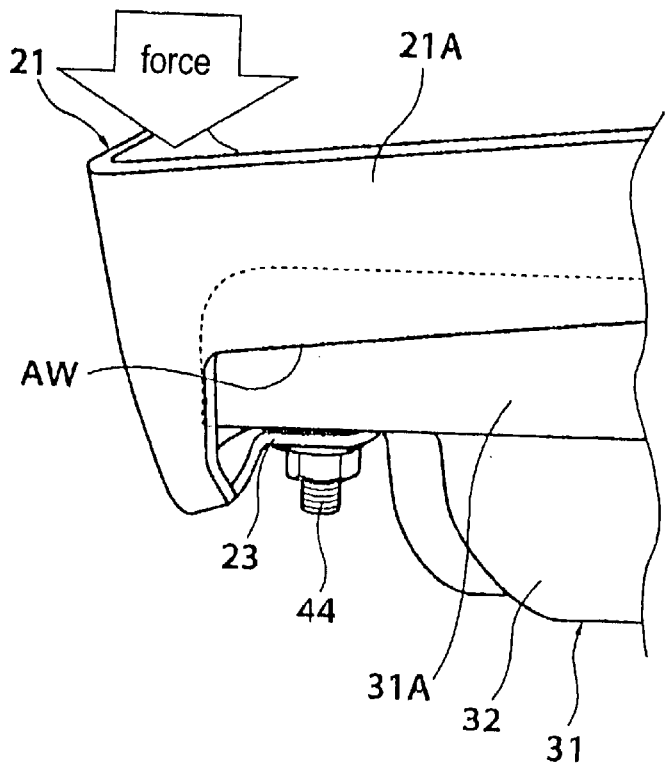

Referring to FIGS. 12(A) and 12(B), a deformation of the fastening portion 23 of the upper retainer 21 will be described. FIGS. 12(A) and 12(B) are enlarged schematic views at the vicinity of the fastening portion of the retainer, respectively, in a normal state and in a deformed state caused by an applied force.

In the normal state shown in FIG. 12(A), the upper surface of the fastening portion 23 of the upper retainer 21 and the lower surface around the corner of the lower retainer 31 are fastened with a bolt-and-nut 44 in a closely contacting manner. When a force is applied in the direction of an arrow indicated in FIG. 12(B), i.e., a downward force is applied at the upper edge around the corner of the upper retainer 21, the fastening portion 23 of the upper retainer 21 is deformed, causing the corner of the upper retainer 21 to be dislocated downward along the side wall 31A of the lower retainer 31. This deformation serves to absorb a load. When the notch 23a is provided at the fastening portion 23 as shown in FIG. 2(E), a crack or breakage of the fastening portion 23 at the notch 23a facilitates the upper retainer 21 to be deformed.

Figure 7A:
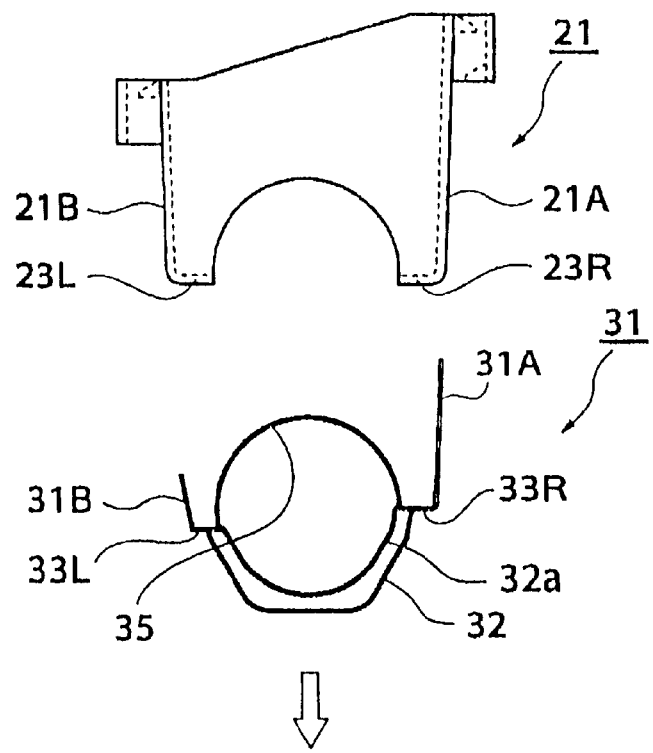
FIGS. 7(A) to 7(C) are diagrammatic views illustrating another example of assembling the retainer.
Figure 7B:
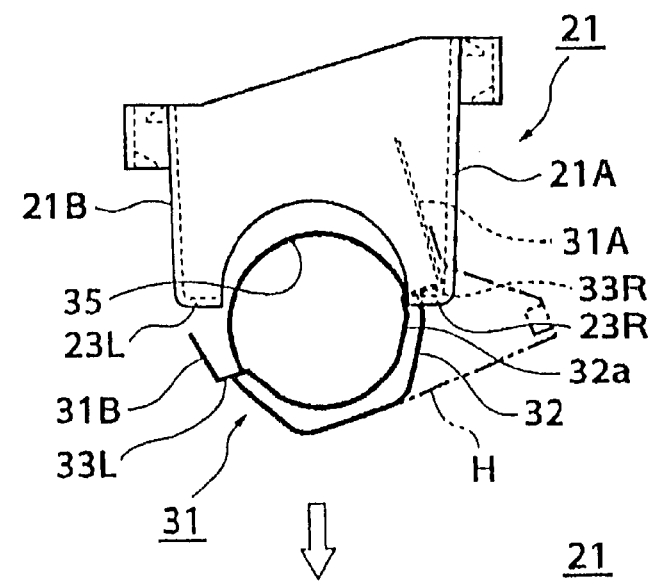
Figure 7C:
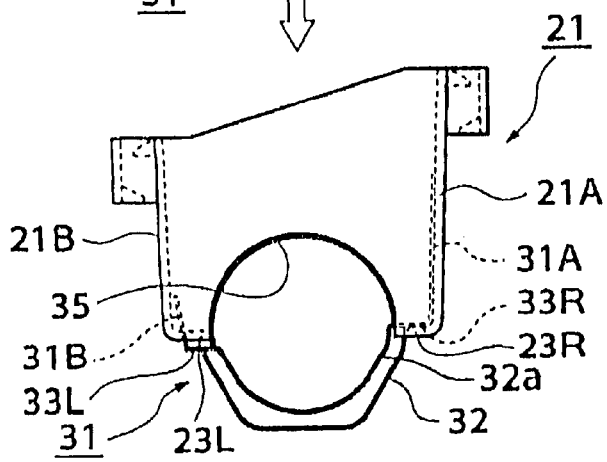

The upper retainer 21 and the lower retainer 31 can be built in the following manner. FIGS. 7(A) to 7(C) are explanatory views illustrating another example of assembling the retainer. In the case shown in FIGS. 7(A) to 7(C), the upper retainer 21 and the lower retainer 31 are fastened in a state such that a left fastening portion 33L of the lower retainer 31 underlies a left fastening portion 23L of the upper retainer 21. On the other hand, a right fastening portion 33R of the lower retainer 31 overlies a right fastening portion 23R of the upper retainer 21. In this example, the lower retainer 31 comes close to the upper retainer 21 from below, and the right fastening portion 33R of the lower retainer 31 is fixed onto the right fastening portion 23R of the upper retainer 21 as shown in FIG. 7(B). Then, the side wall 31B of the lower retainer 31 is inserted inside the side wall 21B of the upper retainer 21 as shown in FIG. 7(C).

With this configuration, the retainer can be assembled so as to allow the lower retainer 31 to come into the upper retainer 21 from below. Thus, the retainer can be easily assembled even if the lower retainer 31 has a protrusion H as shown in two-dot chain lines in FIG. 7(B).

Figure 8A:
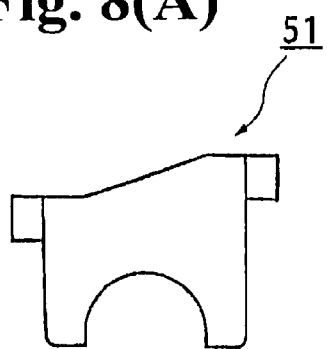
FIGS. 8(A) to 8(C) and 8(E) are diagrammatic side views of different examples of the upper retainers.
Figure 8B:
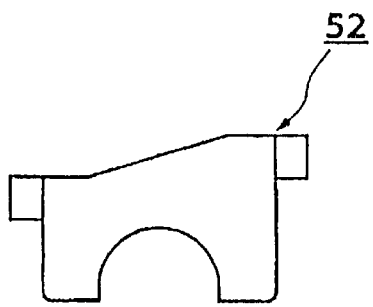
Figure 8C:
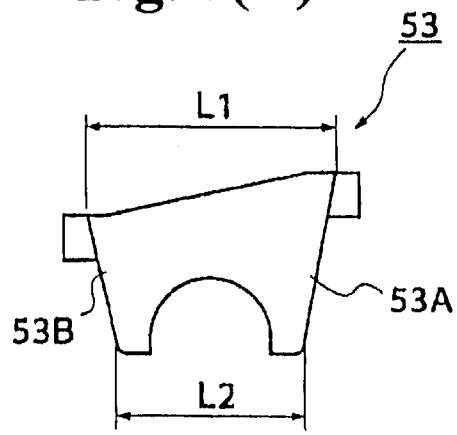
Figure 8D:
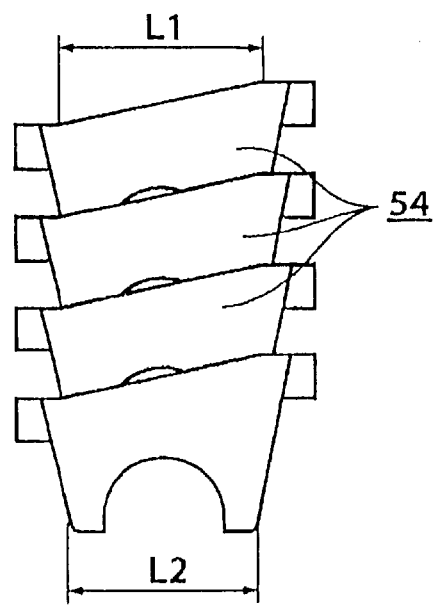
FIG. 8(D) is a diagrammatic side view illustrating a state in which a plurality of upper retainers shown in FIG. 8(C) is stacked.

The above-described retainer 20 can be made in various modifications by different materials as will be described below. FIGS. 8(A) to 8(C), and 8(E) are diagrammatic side views of different examples of the upper retainers. FIG. 8(D) is a diagrammatic side view illustrating a state in which a plurality of upper retainers shown in FIG. 8(C) is stacked. An upper retainer 51 in FIG. 8(A) is of a standard type. An upper retainer 52 in FIG. 8(B) is of a wide-mouthed type having a wide-open mouth. The upper retainer 52 of this type has an advantage of a low profile, so that it is used for an airbag assembly of a vehicle that has limited layout space in an instrument panel in the depth direction.

An upper retainer 53 in FIG. 8(c) is of a type having a trumpet-shaped mouth. In this case, the width L1 of an upper mouth is formed wider than the width L2 of a lower mouth. A plurality of upper retainers of the type, in which the width L1 of an upper mouth is larger than the width L2 of a lower mouth as shown in FIG. 8(C), can be stacked as shown in FIG. 8(D), thereby having an advantage of using less space for transportation or inventory.

Figure 8E:
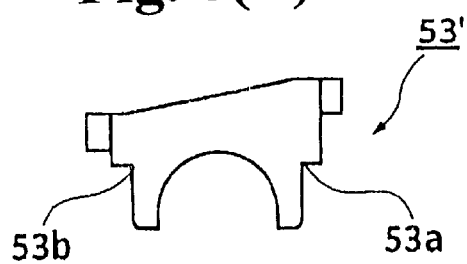

The upper retainer 53' can be formed so as to have stepped-side walls by providing steps 53a and 53b substantially at the midpoints in the vertical direction of the side walls thereof as shown in FIG. 8(E). A plurality of retainers of this type can be also stacked as in the case shown in FIGS. 8(C) and 8(D), thereby having an advantage of less space for transportation or inventory.

Figure 9A:
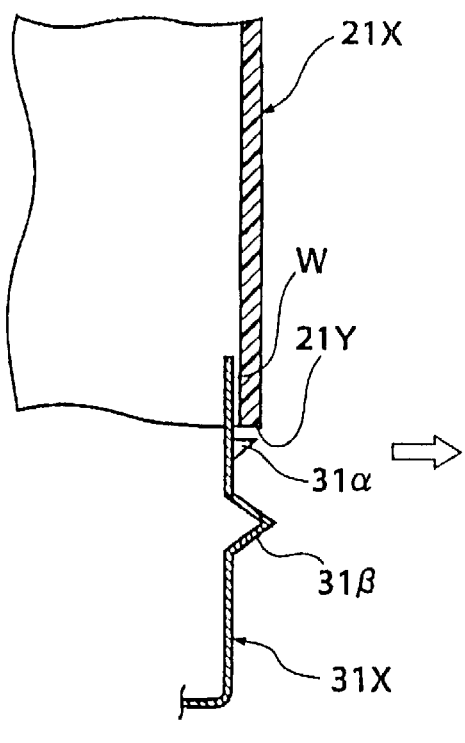
FIGS. 9(A) and 9(B) are diagrammatic side views illustrating another example of a retainer.
Figure 9B:
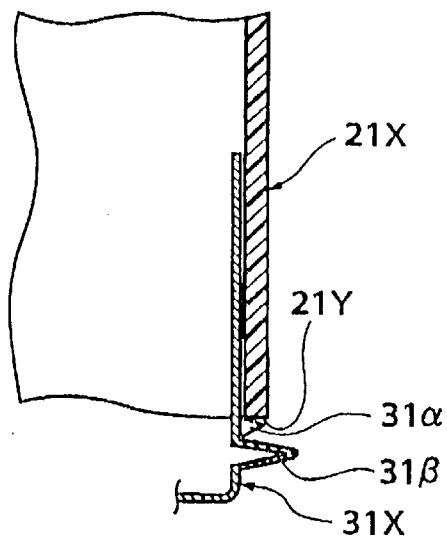
Figure 9C:
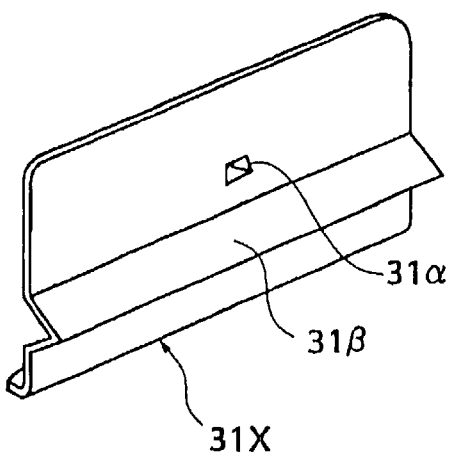
FIG. 9(C) is a diagrammatic perspective view of the example.

FIGS. 9(A) and 9(B) are diagrammatic side views illustrating another example of a retainer, and FIG. 9(C) is a diagrammatic schematic view of the example. The retainer in FIGS. 9(A) to 9(C) has a cut-raise 31α and a protrusion 31β formed on a side wall (lower side wall) 31X of a lower retainer. The cut-raise 31α is formed close to a bottom 21Y of a sidewall (upper side wall) 21X of an upper retainer, and under an overlapped portion W of the upper side wall 21X overlapping the lower sidewall 31X. The cut-raise 31α can be provided by, e.g., punching a part of the lower side wall 31X, and then bending and raising it. The protrusion 31β is formed under the cut-raise 31α so as to extend along the longitudinal direction of the lower side wall 31X. The protrusion 31β can be provided by, e.g., forming a crest in the lower retainer by press molding.

A retainer provided with the cut-raise 31α and the protrusion 31β has the following advantage. When a passenger hits the head against an instrument panel P (see FIGS. 10(A) to 10(C)), the upper retainer is pushed from the upper mouth thereof. Thus, the bottom 21Y of the upper side wall 21X hits and crushes the protrusion 31β of the lower side wall 31X, serving to absorb a load against the passenger.

Figure 11A:
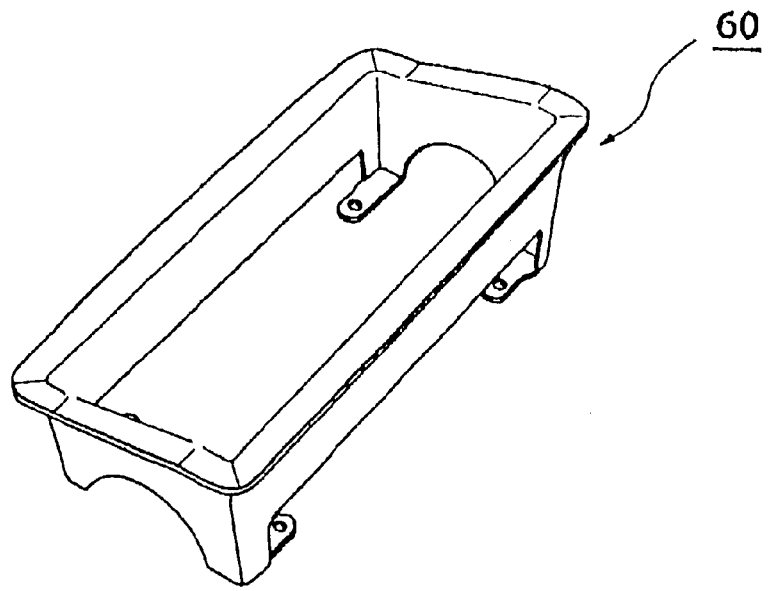
FIGS. 11(A) and 11(B) are a schematic view and a side view of an upper retainer, respectively, according to another embodiment of the present invention.
Figure 11B:
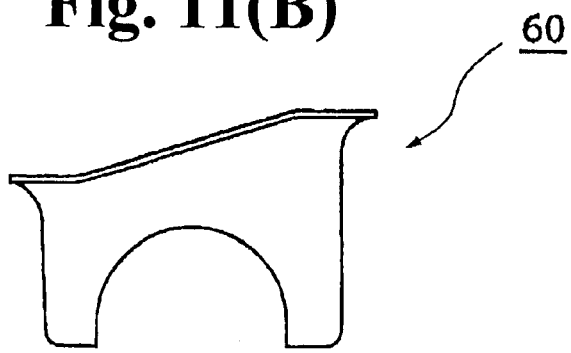

Though the upper retainer of the retainer is made of a resin, such as nylon and polypropylene, in the embodiment described above, the upper retainer may be made of a steel plate as shown in FIGS. 11(A) and 11(B). FIGS. 11(A) and 11(B) are a schematic view and a side view of the upper retainer of a retainer, respectively, according to another embodiment of the present invention.

By using a steel plate with the thickness ranging from 0.8 to 1.2 mm, an upper retainer 60 of a retainer shown in FIGS. 11(A) and 11(B) is formed by deep drawing. A light metal containing at least one of magnesium and aluminum can be used instead of the steel plate as mentioned in this example.

An airbag of the present invention can be used for all other types of vehicles other than automobiles, including bicycles, motorcycles, rockets, space-crafts, boats, ships, airplanes; play equipment, such as roller coasters; mobile equipment for human beings including pedestrians and for animals such as dogs and cats; wheel chairs, and electric walking machines. The airbag may also be used for immovable bodies such as real estates.

As is obvious from the above description, the present invention is intended to provide an airbag retainer having advantages of reduced cost and weight, and so on.

While the invention has been explained with reference to the specific embodiments of the invention, the explanation is illustrative and the invention is limited only by the appended claims.

What is claimed is:

1. An airbag retainer for housing and holding an airbag and an inflator for supplying gas for inflating the airbag, and receiving a cover for covering the retainer, comprising:
   an upper retainer as a bag-housing member made of a resin having an opening to be covered by the cover, and a plurality of flange-shaped fastening portions; and
   a lower retainer as an inflator-holding member made of metal and attached to the bag-housing member to have surface-to-surface contact, said lower retainer being located under the upper retainer and having fastening portions, at least one fastening portion of the upper retainer among the plurality of fastening portions being located under a corresponding fastening portion among the fastening portions of the lower retainer and fastened together.

2. An airbag retainer according to claim 1, wherein the upper retainer and the lower retainer have a plurality of fastening portions, and at least one of the plurality of fastening portions is broken or stretched when a load is applied to an instrument panel of an automobile.

3. An airbag retainer according to claim 1, wherein the upper retainer has a frame-shaped structure provided with side walls on four sides to define the opening, and the lower retainer has side walls on a pair of opposite sides among four sides such that the side walls of the lower retainer partly overlap the corresponding side walls of the upper retainer.

4. An airbag retainer according to claim 3, wherein each of the plurality of fastening portions of the upper retainer has a notch formed therein so that the fastening portion can be broken or stretched at the notch when a load is applied to an instrument panel of an automobile.

5. An airbag retainer according to claim 4, wherein one of the side walls of the upper retainer, which overlaps a corresponding side wall of the lower retainer, has a window formed by cutting a lower part of the side wall, and an outer surface of the side wall of the lower retainer is exposed outward through the window.

6. An airbag retainer according to claim 1, wherein a plurality of reinforcement portions is provided along edges of an upper mouth of the upper retainer.

7. An airbag retainer according to claim 1, wherein said lower retainer includes at least one raised portion projecting outwardly therefrom and located immediately below a lower end of the upper retainer, and a protrusion located below the raised portion to project outwardly therefrom and extending laterally along a longitudinal direction of the lower retainer so that when the upper retainer is pushed downwardly, the protrusion is compressed through the raised portion to absorb a pushing force applied to the upper retainer.

8. An airbag retainer according to claim 1, wherein said upper retainer has four side walls to define the opening, two side walls among the four side walls extending in a longitudinal direction and having elongated windows therein at lower sides, and the lower retainer has four side walls, two side walls among the four side walls extending upwardly and laterally in a longitudinal direction such that the two side walls of the lower retainer extending laterally cover the elongated windows and partly overlap edges thereof.

9. An airbag retainer for housing and holding an airbag and an inflator for supplying gas for inflating the airbag, comprising:
   an upper retainer as a bag-housing member having a plurality of flange-shaped fastening portions; and
   a lower retainer as an inflator-holding member made of metal and having a plurality of flange-shaped fastening portions to have surface-to-surface contact with the fastening portions of the upper retainer, at least one fastening portion of the upper retainer among the plurality of fastening portions being arranged to underlie a corresponding one of the fastening portions of the lower retainer, said lower retainer having at least one raised portion projecting outwardly therefrom and located immediately below a lower end of the upper retainer, and a protrusion located below the at least one raised portion to project outwardly therefrom and extending laterally along a longitudinal direction of the lower retainer so that when the upper retainer is pushed downwardly, the protrusion is compressed to absorb a pushing force applied to the upper retainer.

10. An airbag retainer according to claim 9, wherein said upper retainer is made of a steel plate or a light metal plate containing at least one of magnesium and aluminum.

* * * * *